Feb. 1, 1966          W. J. FOWLER          3,232,317
           SEQUENTIAL IRRIGATION SYSTEM AND CONTROL
Filed Aug. 29, 1963                         2 Sheets-Sheet 1
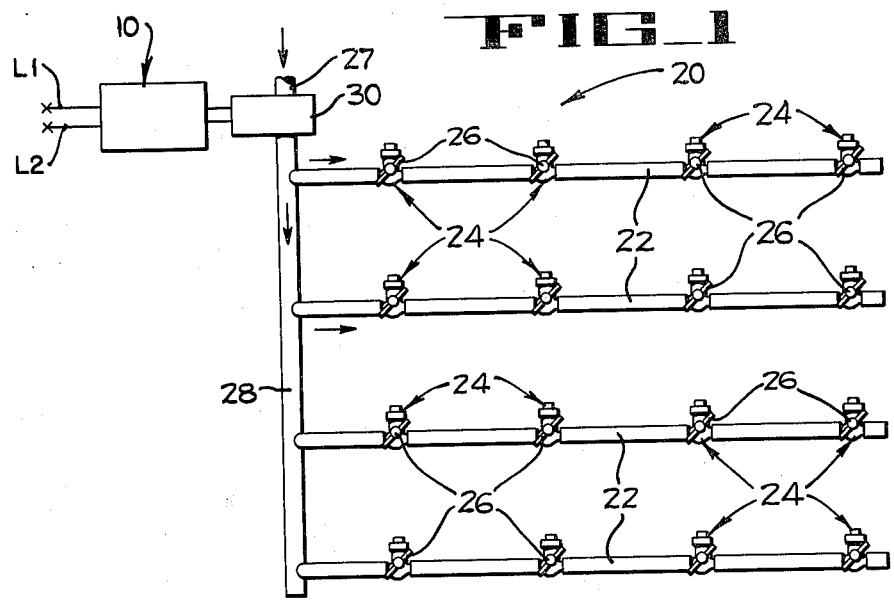
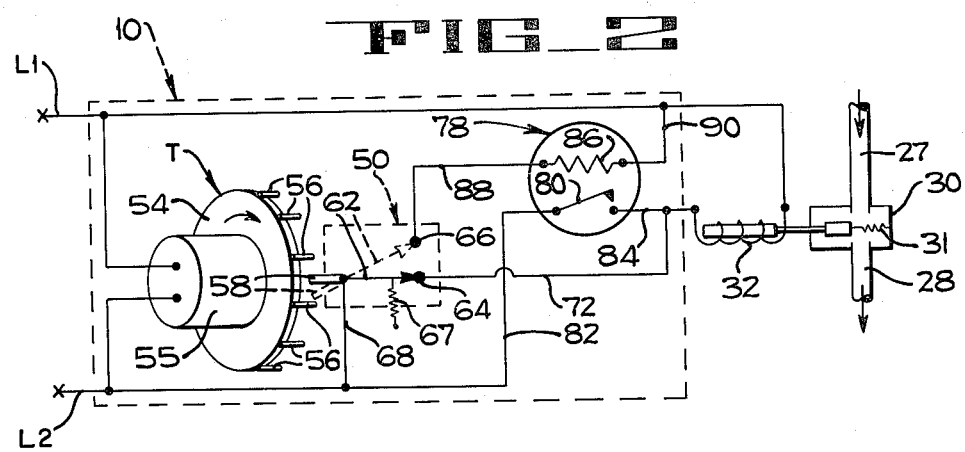
INVENTOR
WILLIAM J. FOWLER
BY *Hans G. Hoffmeister*
              ATTORNEY

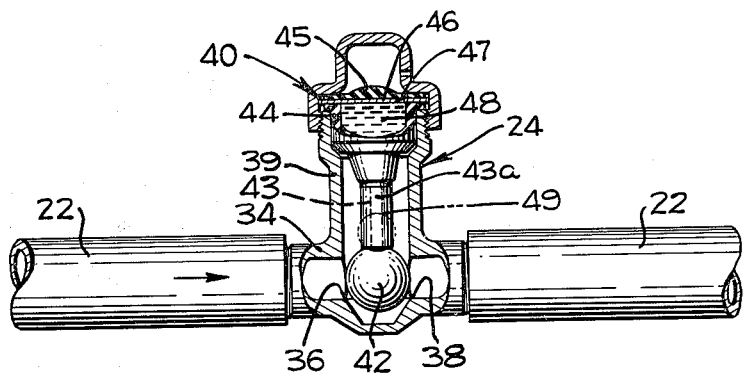
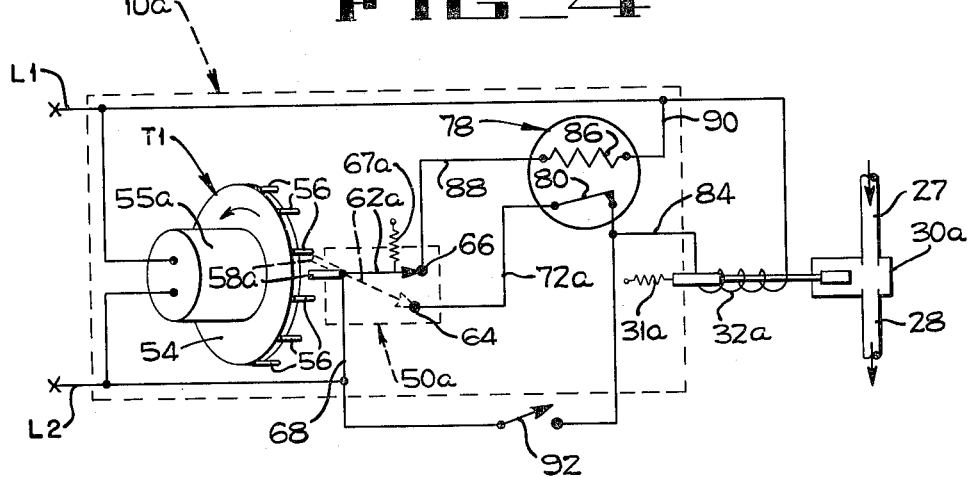

United States Patent Office 3,232,317
Patented Feb. 1, 1966

3,232,317
SEQUENTIAL IRRIGATION SYSTEM AND CONTROL
William J. Fowler, San Jose, Calif., assignor to FMC Corporation, San Jose, Calif., a corporation of Delaware
Filed Aug. 29, 1963, Ser. No. 305,270
3 Claims. (Cl. 137—624.18)

The present invention relates to sequential irrigation systems and their automatic control. This application is a continuation-in-part of the co-pending application of Fowler, S.N. 859,313 (now abandoned), filed December 14, 1959, and assigned to the assignee of the present application.

The sequential irrigation system of the present invention is of the type disclosed in the Stilwell Patent 3,080,881, March 12, 1963, which is assigned to the assignee of the present invention. In this type irrigation system, the flow of water from a source of water under pressure to the sprinkler or flow lateral lines is controlled by a solenoid actuated main valve, controlled by a timer. Each lateral pipe or flow line has a series of spaced sequence valves mounted along its length, and each sequence valve controls a sprinkler that projects upwardly from the valve.

Water is first directed into the system by a solenoid operated main valve between the water supply and the flow lines. When the first sequence valve in each flow line receives water under pressure, the valve begins its sprinkling period. After a preset sprinkling time, the timer controlling the solenoid operated main valve causes the main valve to be temporarily closed, resulting in a pressure drop that actuates the sequence valve in each flow line that has just been directing water for sprinkling, and causes those sequence valves to shift to a position that shuts off its associated sprinkler. When the timer again causes the solenoid operated main valve to open, the flow of water is resumed, and each of the sequence valves associated with the sprinklers which just concluded sprinkling, directs the water to the next downstream sequence valve and sprinkler.

Conventional timing devices have a motor-driven 24-hour dial which carries control switch actuating pins that actuate an electrical control switch. These timers are unsuitable for the above stated use because after the timer dial has actuated the control switch for termination of an individual sprinkling period, the control switch is held in its new position by the timer dial (the main valve closing position) for a relatively long period of time, because of the slow rotation of the dial. Closing of the main valve for a time longer than that required to cause actuation of sequence valves that have been sprinkling is unnecessary, and merely shortens the available sprinkling time in each individual cycle. Furthermore, if the main valve is closed too long, any sequence valves which have been actuated to stop sprinkling, will automatically re-set themselves for sprinkling, which should only occur at the end of the entire sprinkling sequence, as explained in the aforesaid Stilwell patent.

The system of the present invention includes control mechanism for a sequential irrigation system which re-opens the solenoid operated main valve in a few seconds, and independently of the timer and control switch position. Thus the main valve is initially closed by the timer, but it remains closed for a period of time which is relatively short, although adequate to actuate sequence valves. However, this period of main valve closure is not long enough to reset previously actuated sequence valves.

An object of the present invention is to provide an improved sequential irrigation system including a timer and circuits for controlling a solenoid operated valve which requires momentary closing and reopening, for successively actuating sequence valves without resetting those previously actuated.

Another object of this invention is to provide a control mechanism including a timer for interrupting the flow of water in a sequential irrigation system at predetermined intervals, and an auxiliary circuit for re-establishing the flow of water independently of the timer, and early in each interval.

It is also an object to minimize the idle time during a sprinkling cycle.

These and other objects and advantages of the present invention will become apparent from the following description and the accompanying drawings in which:

FIG. 1 is a schematic plan of a sprinkler system embodying the present invention.

FIG. 2 is a schematic diagram of the control system of the present invention including a solenoid operated main water valve.

FIG. 3 is a horizontal section taken through a sequencing valve.

FIG. 4 is a schematic diagram of a modified control system of the present invention.

Referring to FIGURE 1, a timing mechanism 10 is associated with a sequential irrigation system 20 of the type disclosed in the previously identified Stilwell patent. The irrigation system 20 is provided with a plurality of lateral pipes or flow lines 22 which extend between the rows of crops to be irrigated, and each lateral pipe 22 mounts a spaced series of sequence valves 24. Each of the sequence valves 24 controls an associated sprinkler 26 mounted thereon. Irrigation water is supplied to each lateral flow line 22 from a supply conduit 27 to a distribution conduit 28 through a main solenoid operated valve 30. In the embodiment of FIG. 2, the main valve 30 is normally closed by a spring 31 and is opened by a solenoid 32.

The sequence valves 24 in flow lines 22 which are nearest the distribution conduit 28 first receive water, and these sequence valves immediately block off the next downstream sequence valves and direct water through their sprinklers 26. After a sprinkling period controlled by the timing mechanism 10, the solenoid 32 of the main valve 30 causes the main valve to close temporarily. The sequence valves 24 which had been sprinkling are now actuated to a position ready for shutting off their associated sprinklers, and directing incoming water to the downstream sequence valves. When the timing mechanism 10 causes the main valve 30 to reopen, the water flow into the lateral flow lines 22 is resumed and the sequencing valves 24 that were previously sprinkling now direct water to the next downstream sequence valves 24, and the latter valves begin sprinkling. When all of the sprinklers have operated, the timing mechanism 10 is set to leave the main valve 30 closed for a relatively long period of time. During this period, all of the sequence valves automatically reset, ready for a complete new irrigation cycle.

Although the details of the sequence valves 24 are not part of the present invention, a sequence valve adapted for use in the control system of the invention will be briefly described with reference to FIGURE 3. A more complete description of this sequence valve is presented in the aforementioned Stilwell Patent 3,080,881.

The sequence valve 24 of FIGURE 3 is illustrated in the position assumed before initiation of a complete sprinkling cycle, namely, when the water supply has been shut off for a relatively long time. Each valve 24 includes a hollow body 34 which has aligned water conducting ports 36, 38 for connection to the lateral pipe 22 in which the valve is mounted. A tubular member 39 projects horizontally from the body 34 and mounts a diaphragm valve actuating assembly 40, a portion of which is connected to a ball valve 42 by an elastic stem 43, surrounded by a sleeve 43a. The actuating assembly 40 includes a control diaphragm 44, a reservoir diaphragm 45, and an interposed orifice plate 46, which has a small bleed orifice 47. The two diaphragms confine a viscous oil 48. A sprinkler port 49, indicated in phantom in FIGURE 3, is formed in the upper portion of tubular member 39, and connects to a riser pipe (not shown) leading to the sprinkler 26 (FIG. 1).

When the sequence valve 24 is conducting water for sprinkling, the ball valve 42 is forced against port 38, closing off the water supply to the downstream sequence valve 24. The incoming water now flows out through a sprinkler port 49, to the sprinkler 26 (FIG. 1). During sprinkling, the control diaphragm 44 is slowly collapsed, forcing oil through the bleed orifice 47 in the plate 46, and the reservoir diaphragm 45 is distended to receive the oil thus transferred.

During the sprinkling cycle that ensues, the control diaphragm 44 continues to collapse and transfer oil as described. However, the ball valve 42 is trapped at the outlet port 38 under the force of the water pressure, so that the only result of the collapsing of the control diaphragm 44 is to stretch the rubber valve stem 43.

At the end of the sprinkling cycle for each sequence valve, the timing mechanism 10 causes the main valve 30 to be closed for a short period of time. The pressure within the sequence valve body 34 drops to a point where the pressure can no longer keep the ball valve 42 seated at the downstream port 38, and hence can no longer overcome the force of the stretched elastic stem 43 tending to pull the ball valve away from the port 38. Therefore the ball valve 42 is rapidly shifted away from the outlet port 38 by the stretched elastic stem 43, and is moved to a position beneath the sprinkler port 49. When the main valve 30 is again opened and water is directed into the lateral flow lines 22, the valve ball 42 at sprinkler port 49 shuts off the associated sprinkler 26. Also, the water will pass through ports 36 and 38 of the first sequence valve 24 in each lateral 22, and will close the next downstream sequence valve 24, in the same manner previously described, to begin a sprinkling cycle of the associated sprinkler 26.

When the water pressure is shut off for shifting the sequence valve as described, the valve begins to reset, because the reservoir diaphragm 45 begins to re-transfer oil through the bleed orifice 47. However, in the system of the present invention, the water pressure is not interrupted for a length of time sufficient to permit resetting, and the ball valve 42 remains at the sprinkler port 49.

The control system of FIG. 2 which provides this operation of the sequence valves will now be described. The main valve 30 is closed by a spring 31, and is opened upon energization of solenoid 32. The solenoid 32 is in a control circuit including a control switch 50 operated by a timer T forming part of the timing device 10. The timer T has a rotatable timing dial 54, that is slowly driven by a synchronous electric motor 55, energized from supply lines L1 and L2. A plurality of switch actuating pins 56 are mounted on the dial 54, and are adjustable circumferentially of the dial by conventional means, not shown. The spacing of pins 56 determines the basic time interval or sprinkling cycle for each individual sequence valve. The pins successively ride over a switch arm 58 which is disposed in their path, and is connected to the pole 62 of the single-pole, double-throw control switch 50.

As mentioned, the dial 54 is turned very slowly, for example the motor 55 may turn the dial one revolution in a 24 hour period. Thus, the switch actuating pins 56 will be slowly carried past the switch arm 58, and although the throw of arm 58 required to operate the switch pole 62 is actually very short, so that the control switch is quickly shifted by the timer, the timer will hold the switch pole 62 in its new position for a relatively long period of time, namely, 2½–3 minutes. However, the sequence valves 24 require interruption of the water source by the main valve 30 for only 10 seconds or less, to accomplish sequencing. Also, if nothing more were done, some sequence valves might reset during the several minutes that the timer holds the pole 62 of the switch 50 in its new position. Furthermore, this period of time would be wasted, as idle time during each individual sprinkling cycle. However, as will be seen, the control of the present system reopens the main valve 30 independently of the timer.

The switch arm 58 (FIG. 2) moves the pole 62 of the control switch 50 from one position at a contact 64, which is the main valve opening position, to another position (shown in dotted lines) at a contact 66, which is the main valve closing position. This occurs when one of the switch timer dial pins 56 depresses the arm 58. The pole 62 is biased to make contact 64 by a spring 67. One of the power lines, L1, connects directly to one side of the valve opening solenoid 32. The other power line, L2, connects directly to the pole 62 of control switch 50 by a line 68. The normally closed contact 64 of the control switch connects directly to the other side of the solenoid 32 by a line 72. Thus when the pole 62 of the control switch is released by the timer (as seen in solid lines in FIG. 2), a circuit is completed from supplying line L2, line 68, switch pole 62, line 72, and through the solenoid 32 to line L1, with which the main valve 30 is opened.

As mentioned, a time delay unit is provided to remove control of the solenoid 32 from the timer T, while a timer dial pin 56 is holding the switch arm 58 and control switch pole 62 so as to open contact 64 and close contact 66. This time delay unit, illustrated generally at 78, is of the thermostatic switch type, and includes a normally open, single pole-single throw thermostatically operated bimetallic switch 80, which serves as an auxiliary switch, and which is normally open. The pole of switch 80 connects directly to the power line L2 by a line 82, and its contact connects to the aforesaid other side of the solenoid 32 by a line 84. Thus the auxiliary switch 80 is connected across, or in parallel with the control switch 50, and when it is closed it will re-energize the solenoid 32, and re-open the main valve 30, independently of the control switch 50.

In order to close the thermostat auxiliary switch 80 independently of the control switch 50, a resistance heater 86 is included in the time delay unit 78. The heater is mounted close to the normally open auxiliary switch 80, so that within a few seconds after energization of the heater 86, the auxiliary switch 80 is closed, to energize the solenoid 32 and re-open the main valve 30 independently of the control switch, as described. One side of the heater 86 connects to the normally open contact 66, of the control switch 50, by means of a line 88, whereas the other side of the heater 86 connects directly to one side, L1, of the power line, by means of a line 90.

In operation, one sprinkler in each flow line 22 (FIG. 1) will be sprinkling when the pole 62 of the control switch is released by the pins 56 of the timer, so that the control switch is in the solid line position of FIG. 2. In this position the solenoid 32 is energized through the control switch 50, and the main valve 30 is opened. With the control switch pole 62 thus making contact 64, contact 66 is opened, the heater 86 is de-energized, and the normally open auxiliary switch 80 remains open.

The sprinklers continue to receive water until the switch actuating pin 56 on the timer dial that is approaching the switch actuating arm 58 moves the arm far enough to pivot the switch pole 62 away from the normally closed contact 64 to the other contact 66. As soon as this occurs, the electrical continuity from line L2 to the solenoid 32 is broken. The main valve 30 immediately closes, and shuts off the water to the sprinklers which have been operating.

As mentioned, if the main valve 30 were controlled only by means of the contact 64 in the control switch 50, the next downstream sprinkler 26 on each lateral line 22 could not operate until the switch actuating arm 58 was released by the timer pin 56, in order to allow the switch pole 62 to return to the contact 64, and again establish electrical continuity to the solenoid 32. Thus the sprinklers would all be disabled for 2½-3 minutes, and the irrigation system 20 would be idle while waiting for the pin 56 to permit the sprinkling to resume. Also, some sequence valves might reset. However, the timing mechanism of the present invention provides the short interval of a few seconds between the operation of successive sprinklers.

When the timer opens contact 64, it closes contact 66 as described, so that the control switch 50 immediately energizes the heater 86. With the heater 86 energized, the bimetallic auxiliary switch 80 closes after approximately 10 seconds, to re-energize the solenoid 32 and reopen the main valve 30. When the water again flows through the main valve 30 it flows to the next downstream series of sprinklers 26, because the ten-second de-energization period of the solenoid 32 is sufficient to cause the previously sprinkling sequence valves to be actuated as described, in response to the pressure drop that had just ended. In this manner, the idle time of the entire irrigation system 20 is held at a minimum.

After a relatively long period of time, namely, after about 2½-3 minutes, the timer pin 56 will move out of engagement with the switch actuating arm 58, and the pole 62 will spring back to the contact 64. The solenoid 32, will not be de-energized during the time the pole 62 is moving from the contact 66 back to the contact 64, however, because the cooling time constant of the relay 78 is such that the bimetallic switch 80 will remain closed until well after the pole 62 re-engages contact 66. This cooling time is in the order of 4 or 5 seconds, so that it represents substantially no limitation on the minimum interval between individual sprinkling cycles.

By selecting a thermostatic delay relay 78 having the desired time constant, the de-energization period can be adapted for any circuit controlled by the timing mechanism 10. Thermostatic delay relays of the type disclosed are available for battery operation, and thus can be used with a spring wound or battery operated timer at a location remote from the conventional power source, provided that the solenoid coil 32 is also wound for battery operation.

The embodiment of the invention illustrated in FIG. 4 has the same basic mode of operation as that of FIG. 2, except that the control and auxiliary switches are in series instead of in parallel, and the main valve is spring opened and is closed by the solenoid, instead of being opened by the solenoid.

In FIG. 4, as seen in solid lines, the control switch 50a and the timer T1 are rearranged so that the pole 62a of the control switch normally engages the heater contact 66 of the time delay relay 78. This closes the auxiliary thermostat switch 80, but in this embodiment the circuit through the solenoid 32a is not completed through the auxiliary switch, because line 72a leading to the auxiliary switch runs from control switch contact 64, which is normally open. Thus the solenoid 32a is normally de-energized (instead of being normally energized as before), and the main valve is held open by spring 31a.

To initiate the sequence valve shifting action, a pin 56 on the dial 54 of timer T1 engages arm 58a of the pole 62a of the control switch 50a, breaking contact 66 (which is now the normally closed control switch contact) and making contact 64. A circuit to the main valve closing solenoid 32a is now completed through L2, line 68, switch pole 62a, line 72a, auxiliary switch 80, line 84, the solenoid, and line L1. The solenoid 32a is now energized, main valve 30a is closed, and the resultant drop in water pressure shifts the sequence valves.

The aforesaid opening of control switch contact 66 also de-energizes the heater 86 for the auxiliary thermostat switch 80. In 3 or 4 seconds the heater 86 cools sufficiently to permit the auxiliary switch 80 to open. The aforesaid circuit through the main valve closing solenoid 32a is now interrupted, and valve spring 31a opens the main valve 30a to initiate a new sprinkling cycle. Thus in this modification as in the other, the auxiliary switch in the time delay unit 78 controls the main valve independently of the timer and control switch, once the timer has initiated an individual sprinkling cycle. A manually operated switch 92 is provided, which shunts the control and auxiliary switches, and hence permits closing of the main valve 32a independently of the operation of the timer and control circuit.

It will be understood that various changes and modifications may be made without departing from the spirit and scope of the invention, as defined in the appended claims.

I claim:

1. In a sequential irrigation system of the type having a flow line for connection to a source of water under pressure, a plurality of sequence valves connected in series along said flow line, the sequence valves each having a water outlet for connection to a sprinkler, each sequence valve starting its sprinkling cycle upon first receiving water under pressure from the flow line and then automatically terminating its sprinkling cycle to direct water to the next downstream sequence valve in response to a temporary decrease in water pressure in the flow line followed by a re-establishment of the pressure, the sequence valves automatically resetting to their sprinkling position after elapse of a relatively long period of decreased water pressure in the flow line; control means for said system comprising a main valve for connection between the water source and the flow line, a source of electrical energy, solenoid means for operating said main valve and connected to one side of said energy source, a control circuit including a double-throw control switch connected to the other side of said energy source and having a first position for connecting the other side of said energy source to said solenoid means and a second position, time delay means including an auxiliary solenoid means controlling switch having an open position, and a closed position for connecting the other side of said energy source to said solenoid means, one of said control and auxiliary switch positions being a main valve opening position and the other position of each switch being a main valve closing position, said time delay means also including an auxiliary switch operator connected to said one side of the energy source and to said control switch when the latter is at its second position, and a timer for periodically shifting said control switch from its main valve opening position to its main valve closing position, the shifting of said control switch to its main valve closing position by said timer closing said main valve and conditioning said auxiliary switch operator for moving said auxiliary switch to its main valve opening position after a relatively short time delay period, said auxiliary switch moving to its main valve opening position and said solenoid means reopening said main valve after termination of said relatively short time delay period, said time delay period ending early in each of said timer intervals, and being long enough to accommodate sequence valve shifting but too short to permit the sequence valves to reset before said timer shifts said control switch back to its main valve opening position.

2. In a sequential irrigation system of the type having a flow line for connection to a source of water under pressure, a plurality of sequence valves connected in series along said flow line, the sequence valves each having a water outlet for connection to a sprinkler, each sequence valve starting its sprinkling cycle upon first receiving water under pressure from the flow line and then automatically terminating its sprinkling cycle to direct water to the next downstream sequence valve in response to a temporary decrease in water pressure in the flow line followed by a re-establishment of the pressure, the sequence valves automatically resetting to their sprinkling position after elapse of a relatively long period of decreased water pressure in the flow line; control means for said system comprising a normally closed main valve for connection between the water source and the flow line, a source of electrical energy, solenoid means for opening said main valve when energized and connected to one side of said energy source, a control circuit including a double-throw control switch having the pole thereof connected to the other side of said energy source and having a first position for connecting the other side of said energy source directly to said solenoid means for opening said main valve, and a second position for interrupting said direct connection to said solenoid means to close said main valve, time delay means including a normally open auxiliary switch connected between said other side of said energy source and said solenoid means, said time delay means also including an auxiliary switch operator connected to said one side of the energy source and to said control switch pole when the latter is at its second position, and a timer for periodically shifting said control switch pole from its main valve opening first position to its main valve closing second position, the shifting of said control switch to its main valve closing second position by said timer closing said main valve and conditioning said auxiliary switch operator for closing said normally open auxiliary switch after a relatively short time delay period, said auxiliary switch closing and energizing said solenoid means for reopening said main valve after termination of said relatively short time delay period, said time delay period ending early in each of said timer intervals and being long enough to accommodate sequence valve shifting but too short to permit the sequence valves to reset before said timer shifts said control switch back to its main valve opening first position.

3. The sequential irrigation system of claim 2, wherein said auxiliary switch is a thermostat switch and said auxiliary switch operator is a resistance heating element.

References Cited by the Examiner
UNITED STATES PATENTS

| | | | |
|---|---|---|---|
| 2,372,324 | 3/1945 | Hauser | 137—624.2 |
| 2,921,629 | 1/1960 | Stout | 239—66 X |
| 3,080,881 | 3/1963 | Stilwell | 137—624.14 X |

ISADOR WEIL, *Primary Examiner.*

WILLIAM F. O'DEA, *Examiner.*